(12) United States Patent
Tung et al.

(10) Patent No.: US 7,474,369 B2
(45) Date of Patent: Jan. 6, 2009

(54) PIXEL DEVICE OF A TRANSFLECTIVE-TYPE LIQUID CRYSTAL PANEL

(75) Inventors: Hsiu-Chi Tung, Taipei (TW); Chih-Ming Chang, Chung Li (TW); Ching-Huan Lin, Hsin Ying (TW)

(73) Assignee: AU Optronics Corp. (TW)

( * ) Notice: Subject to any disclaimer, the term of this patent is extended or adjusted under 35 U.S.C. 154(b) by 0 days.

(21) Appl. No.: 11/907,427

(22) Filed: Oct. 12, 2007

(65) Prior Publication Data

US 2008/0030664 A1     Feb. 7, 2008

Related U.S. Application Data

(63) Continuation of application No. 10/867,670, filed on Jun. 16, 2004, now Pat. No. 7,349,046.

(30) Foreign Application Priority Data

Feb. 6, 2004     (TW) .............................. 93102785 A

(51) Int. Cl.
  *G02F 1/1335*     (2006.01)
(52) U.S. Cl. .................. 349/114; 349/117; 349/121

(58) Field of Classification Search ................. 349/114, 349/117, 121
See application file for complete search history.

(56) References Cited

U.S. PATENT DOCUMENTS 6,654,087 B2 * 11/2003 Song et al. ................... 349/113
2004/0246418 A1 * 12/2004 Kumagai et al. ............ 349/117

FOREIGN PATENT DOCUMENTS

CN     1460193     12/2003
JP     2003149644    5/2003

* cited by examiner

*Primary Examiner*—Mike Qi
(74) *Attorney, Agent, or Firm*—Troxell Law Office, PLC

(57) ABSTRACT

A pixel device of a transflective-type LCD comprises an upper panel, a lower panel, a liquid crystal layer, and a liquid crystal film. The lower panel is assembled beneath the upper panel, and an upper surface of the lower panel is divided into a reflective region and a naked transmission region. The liquid crystal layer is interposed between the upper panel and the lower panel. The liquid crystal film is positioned above the liquid crystal layer to compensate possible retardation resulted from the liquid crystal layer.

16 Claims, 5 Drawing Sheets

PIXEL DEVICE OF A TRANSFLECTIVE-TYPE LIQUID CRYSTAL PANEL

This application is a Continuation of application U.S. Ser. No. 10/867,670, entitled "A PIXEL DEVICE OF A TRANSFLECTIVE-TYPE LIQUID CRYSTAL PANEL" and filed on Jun. 16, 2004 now U.S. Pat. No. 7,394,046.

BACKGROUND OF THE INVENTION (1) Field of the Invention

This invention relates to a pixel device of a transflective-type liquid crystal panel, and more particularly to a pixel device that replaces quarter-wave plates and half-wave plates functionally with a liquid crystal film.

(2) Description of Related Art

Recently, liquid crystal displays (LCD) become more popular than ever as a display component of personal digital assistants (PDA), notebooks (NB), digital cameras (DC), digital videos (DV), mobile phones, etc. Due to lack of self-illumination, a cold cathode fluorescent lamp (CCFL) is inserted in the LCD as a backlight source. In addition, several optical films are sandwiched layer-wise between the backlight and the panel to form a light path or quasi-lens.

Ordinarily, less than 10% the illumination of the backlight is able to reach human eyes in front of the panel to display image, and the rest of illumination is actually blocked by the optical films and the liquid crystal layer of the panel. Therefore, a reflective-type LCD is developed for achieving a better power consumption than conventional LCD. The reflective-type LCD uses ambient illumination as the light source, and so the CCFL and the optical films are no longer needed in this type of display panel. As a result, the power consumption of the transflective-type display can be lowered down and also the size can be slimmer. Yet, when the ambience is dark, the performance of the reflective-type LCD would be poor.

Thereby, the transflective-type LCD is introduced to integrate advantages of the transmission-type and reflective-type LCD. The usage of the ambient light or backlight can be optioned according to the environmental brightness. When the ambient light is sufficient, this LCD can function as a reflective-type one and so the power consumption can be saved. On the other hand, when the ambience is dark, this LCD can function as a transmission-type one and so the required illumination is provided by the backlight.

Referring to FIG. 1, a pixel device of a traditional transflective-type LCD comprises an upper panel 100, a lower panel 300, and an interposed liquid crystal layer 200. The upper panel 100 is composed mainly of a glass substrate 108. A quarter-wave plate 106, a half-wave plate 104, and a first polarizer 102 are formed layer-by-layer over an upper surface of the glass substrate 108. A color filter layer 110 and a common electrode layer 112 are attached, also layer-by-layer, to a lower surface of the glass substrate 108. The lower panel 300 is composed mainly of a glass substrate 308. A quarter-wave plate 306, a half-wave plate 304, and a second polarizer 302 are attached layer-wise to a lower surface of the glass substrate 308. A pixel electrode layer 312 and a reflector 314 are formed layer-wise in a serial over an upper surface of the glass substrate 308. The reflector 314 as shown includes an organic layer 3142 plated with a reflective film 3144. The reflective film 3144 is composed of a conductive material and connects to the pixel electrode layer 312. Thereby, the upper surface of the glass substrate 308 is divided into a transmission region T and a reflector 314 denoted as a reflective region R. Upon such an arrangement, the liquid crystal layer 200 can be driven to display images by an electric field formed between the common electrode layer 112 and the pixel electrode layer 312.

It is noticed that the ambient light passes through the liquid crystal layer 200 twice in the reflective region R, whereas the backlight passes through the liquid crystal layer 200 merely once in the transmission region T. As a result, contributions of the liquid crystal layer 200 toward the ambient light or the backlight are different. As shown in FIG. 1, a traditional method to compensate the difference is utilized to modulate the thickness of the liquid crystal layer 200 in the reflective region R by changing the thickness of the organic layer 3142.

The polarizers 102 and 302 are set at a particular polarizing direction to shield a portion of the ambient light and the backlight so as to have linear polarized lights entering the pixel device. The quarter-wave plates 106 and 306 are used to transform the linear polarized light into circular polarized one, so that the liquid crystal layer 200 is able to adjust the polarization of the ambient light and the backlight. It is noted that the quarter-wave plates 106 and 306 are designed within a certain frequency range. Thus, to have those foregoing plates operated at a frequency beyond the design frequency range will definitely cause a significant bias. The half-wave plates 104 and 304 are used mainly for spreading the frequency range of the quarter-wave plates 106 and 306 so as to make sure that the linear polarized light can be transformed into an ideal circular polarized light throughout the whole visible light frequency range.

As mentioned in the above paragraph, the polarizers 102 and 302, the quarter-wave plates 106 and 306, and the half-wave plates 104 and 304 are necessary in order to have the traditional LCD properly function. However, the cost of forming such optical modulation structures is obviously high, and the manufacturing process is too complicated to have a satisfied yield.

SUMMARY OF THE INVENTION

A main object of the present invention is to provide a pixel device of a transflective-type LCD by using a liquid crystal film to replace the quarter-wave plates and the half-wave plates for reducing the fabrication cost.

The pixel device of the transflective-type LCD in accordance with the present invention comprises an upper panel, a lower panel, a liquid crystal layer, and a liquid crystal film. The lower panel is assembled beneath the upper panel, and an upper surface of the lower panel is divided into a reflective region covered by a reflector and a naked transmission region. The liquid crystal layer is interposed between the upper panel and the lower panel. Moreover, the liquid crystal film is positioned above the liquid crystal layer to compensate possible retardation caused by the liquid crystal layer.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiment illustrated in the drawings, in which.

DETAIL DESCRIPTION OF THE PREFERRED EMBODIMENTS

Figure 1:
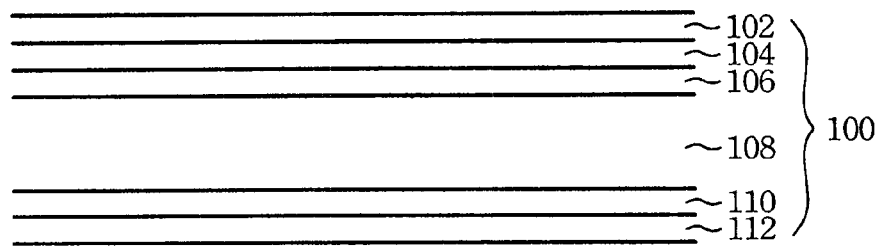
FIG. 1 depicts a schematic view of a pixel device in a traditional transflective-type LCD.
Figure 1:
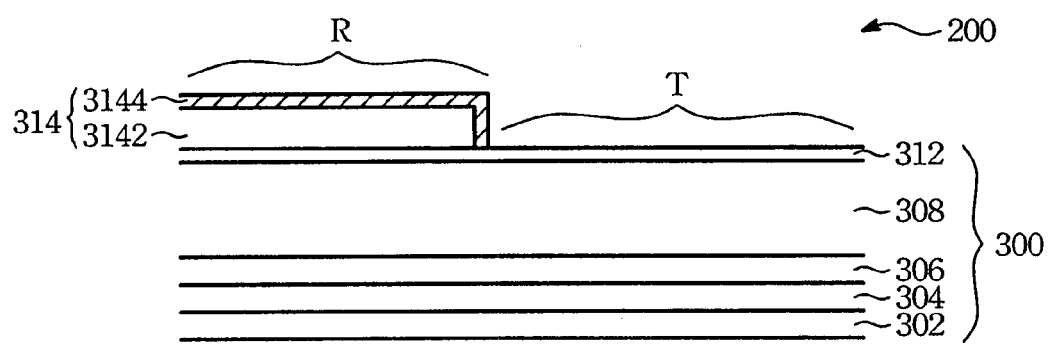
Figure 2:
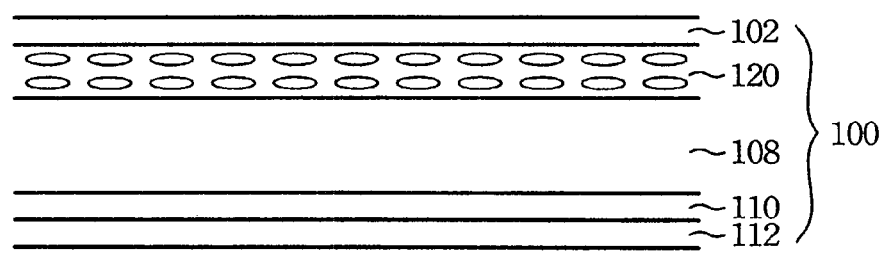
FIG. 2 depicts a schematic view of a preferred embodiment of a pixel device in a transflective-type LCD of the present invention.
Figure 2:
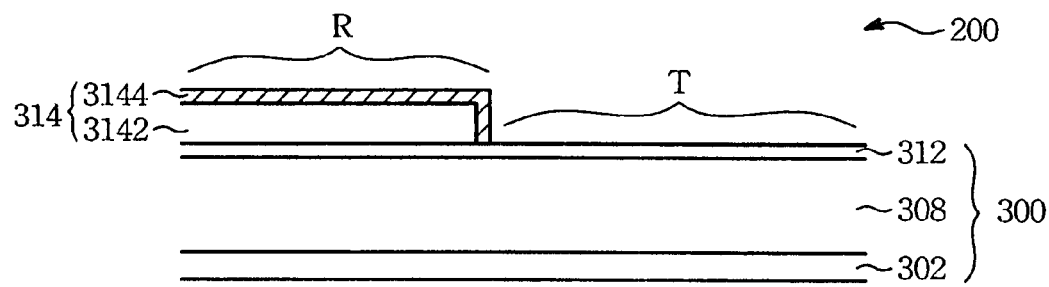

FIG. 2 shows a preferred embodiment of a pixel device in a transflective-type LCD in accordance with the present invention. The pixel device comprises an upper panel 100, a lower panel 300, and a liquid crystal layer 200 interposed between the upper panel 100 and the lower panel 300. The upper panel 100 is composed mainly of a glass substrate 108. A liquid crystal film 120 and a first polarizer 102 are formed layer-wise in a serial on an upper surface of the glass substrate 108. A color filter layer 110 and a common electrode layer 112 are formed also layer-wise in a serial under a lower surface of the glass substrate 108. The lower panel 300 is composed mainly of a glass substrate 308. A second polarizer 302 is formed under a lower surface of the glass substrate 308 with a transmission axis perpendicular to that of the first polarizer 102. A pixel electrode layer 312 and a reflector 314 are formed layer-wise in a serial on an upper surface of the glass substrate 308. The reflector 314 is formed as an organic layer 3142 plated with a reflective film 3144. The reflective film 3144 is composed of a conductive material and extends at one end to connect at a proper mid-portion of the pixel electrode layer 312, Such that the upper surface of the glass substrate 308 can be divided into a transmission region T and a reflective region R covered by the reflector 314. Upon such an arrangement, an electric field formed between the common electrode layer 112 and the pixel electrode layer 312 can be utilized to drive the liquid crystal layer 200 and thus to display images.

In this embodiment, the liquid crystal film 120 is sandwiched between the glass substrate 108 and the first polarizer 102 for compensating possible retardation resulted from the liquid crystal layer 200. However in the present invention, the liquid crystal film 120 may be still formed in a different lateral position of the upper panel 100, such as a position under the lower surface of the glass substrate 108, or one between the color filter 110 and the common electrode layer 112.

Figure 3:
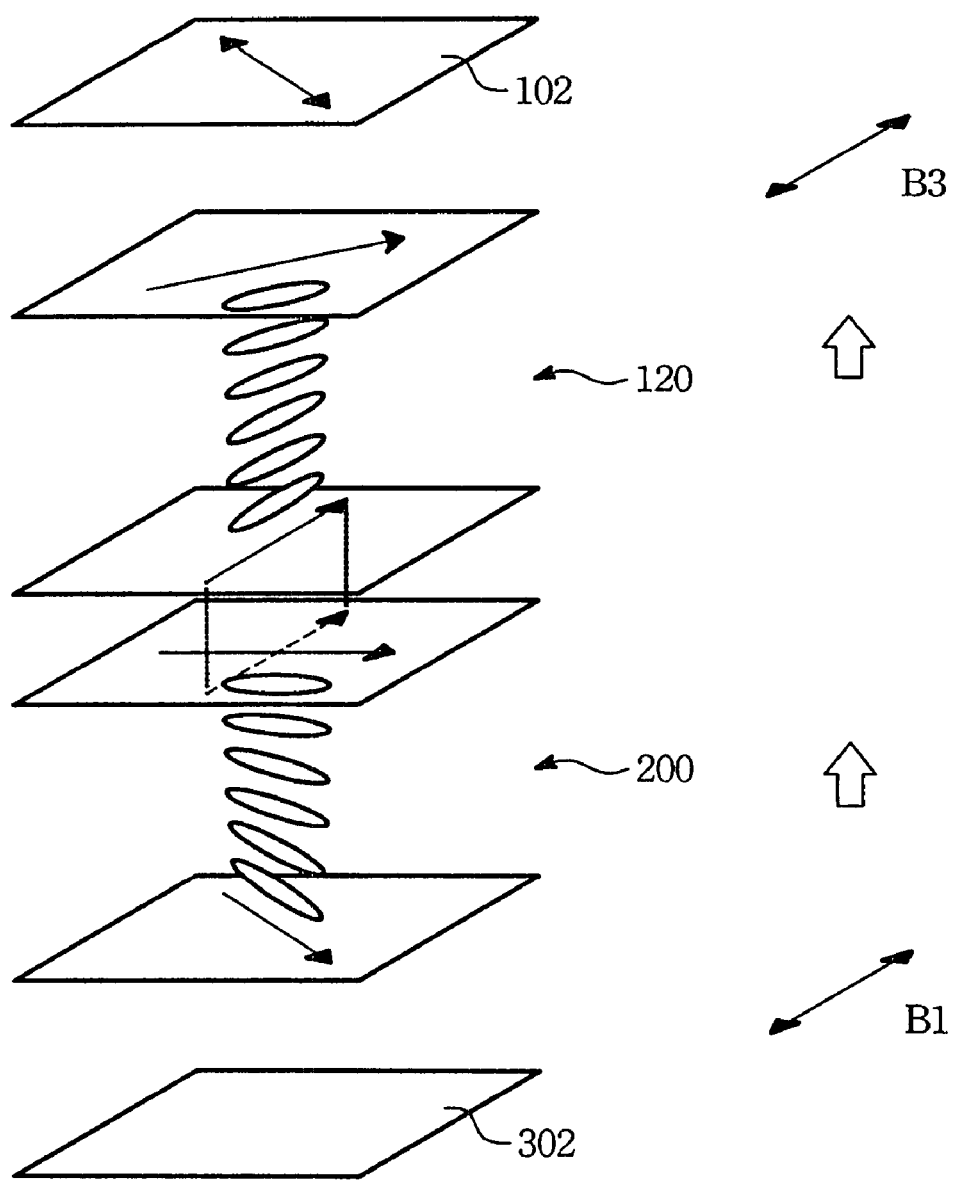
FIG. 3 depicts a schematic view showing an optical modulation result in a transmission region of a transflective-type LCD in accordance with the present invention, with no operation voltage applied therein.

While the pixel device has no applying voltage, as shown in FIG. 3, the backlight passes through the second polarizer 302 in the transmission region T to form a linear polarized light B1. The linear polarized light B1 then passes through the liquid, crystal layer 200 and the liquid crystal film 120 to form another linear polarized light B3 leaving the liquid crystal film 120 with an identical polarizing direction with respect to the linear polarized light B1. Because the transparency axes of the first polarizer 102 and the second polarizer 302 are perpendicular to each other, the linear polarized light B3 is shielded by the first polarizer 102 and thus unable to leave the pixel device.

In order to make sure that the linear polarized light B1 and B3 has the identical polarizing direction, the liquid crystal layer 200 and the liquid crystal film 120 must meet following requirements:

1. The liquid crystal film 120 needs to be set with the same retardation as the liquid crystal layer 200 in amount but opposite in the spiral direction. For example, as shown in FIG. 3, if the liquid crystal layer 200 is set with a counterclockwise rotation of a ⅛ circle with no operation voltage, the liquid crystal film 120 should be set with a clockwise rotation of a ⅛ circle accordingly.

2. The liquid crystal layer 200 and the liquid crystal film 120 must be set with an identical amount of retardation with no operation voltage.

3. The relative liquid crystal molecules in the liquid crystal film 120 and those in the liquid crystal layer 200 must be perpendicular with each other with no operation voltage. For example, as shown in FIGS. 2 and 3, the liquid crystal molecule in the liquid crystal layer 200 adjacent to the lower surface of the upper panel 100 must be perpendicular to that in the liquid crystal film 120 adjacent to the glass substrate 108, and the liquid crystal molecule in the liquid crystal layer 200 adjacent to the upper surface of the lower panel 300 must perpendicular to that in the liquid crystal film 120 adjacent to the first polarizer 102.

By having the above restrictions, the retardation of the linear polarized light B1 and the B3 can be cancelled with each other. Therefore, the linear polarized lights B1 and B3 with identical polarizing direction can be assured.

Figure 4:
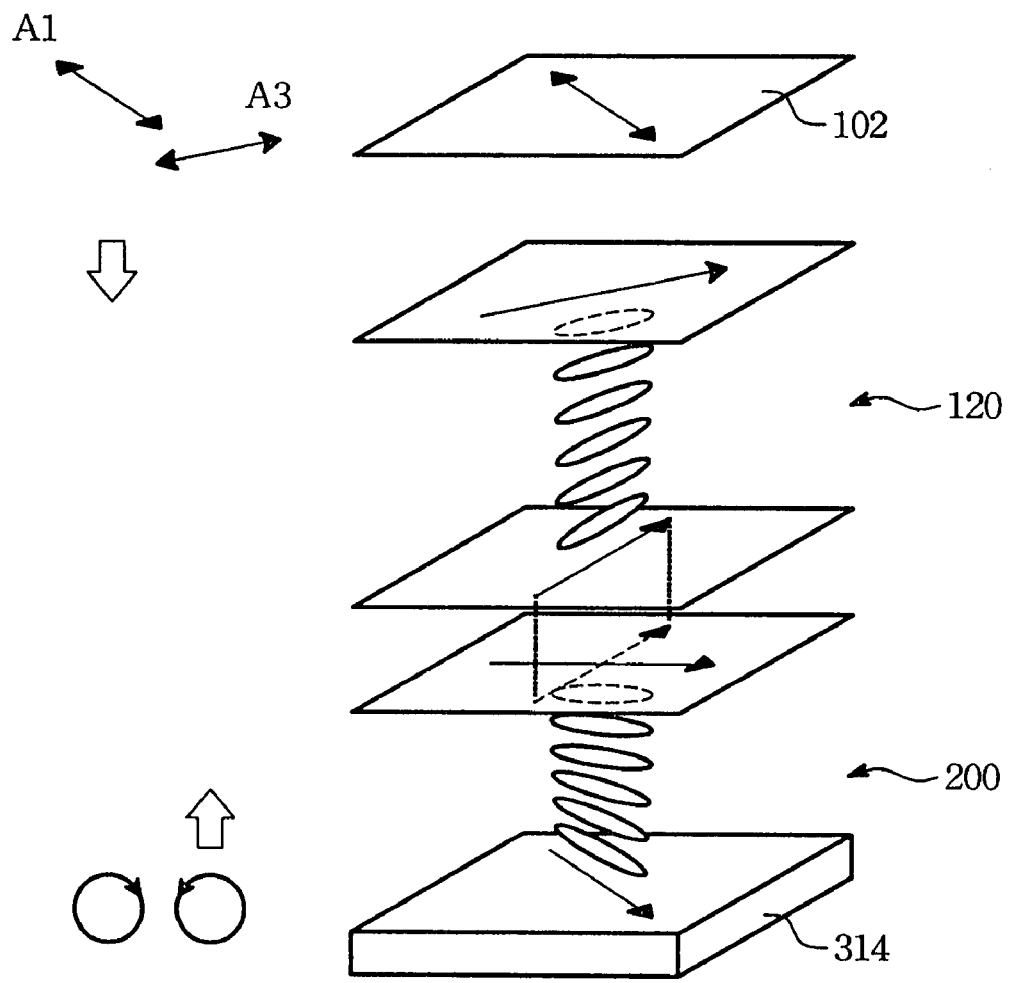
FIG. 4 depicts a schematic view showing an optical modulation result in a reflective region of a transflective-type LCD in accordance with the present invention, with no operation voltage applied therein.

In the case that the pixel device has no applying voltage as shown in FIG. 4, the ambient light passes through the first polarizer 102 in the reflective region R to form a linear polarized light A1. Afterward, the linear polarized light A1 passes through the liquid crystal film 120 and the liquid crystal layer 200 to reach the reflector 314, and then is reflected back into the liquid crystal layer 200 and the liquid crystal film 120 again to result a linear polarized light A3 after leaving the liquid crystal film 120. As noted, the polarizing direction of the linear polarized light A3 and that of the linear polarized light A1 are perpendicular with each other so that the linear polarized light A3 cannot pass through the first polarizer 102.

In the present invention, the stacked structure having the liquid crystal layer 200 and the liquid crystal film 120 as described above can perform as an optical modulation structure like a quarter-wave plate does while the ambient light is used. The linear polarized light A1 passing through the stacked structure twice is transformed into a perpendicular linear polarized light A3 with a polarizing direction perpendicular to the linear polarized light A1. The optical modulation structure can be made by adjusting the thickness of the reflector 314 so as to change the contribution of the liquid crystal layer 200 in the reflective region R with respect to that of the transmission region T.

In the case that the pixel device is applied with an operation voltage, the liquid crystal molecules in the liquid crystal layer 200 are driven to be perpendicular aligned with respect to the panels 100 and 300, and thus the liquid crystal layer 200 shows no retardation. For the liquid crystal film 120 is composed of polymers and is not affected by the operation voltage, so the preset retardation of the liquid crystal film 120 can remain the same.

Figure 5:
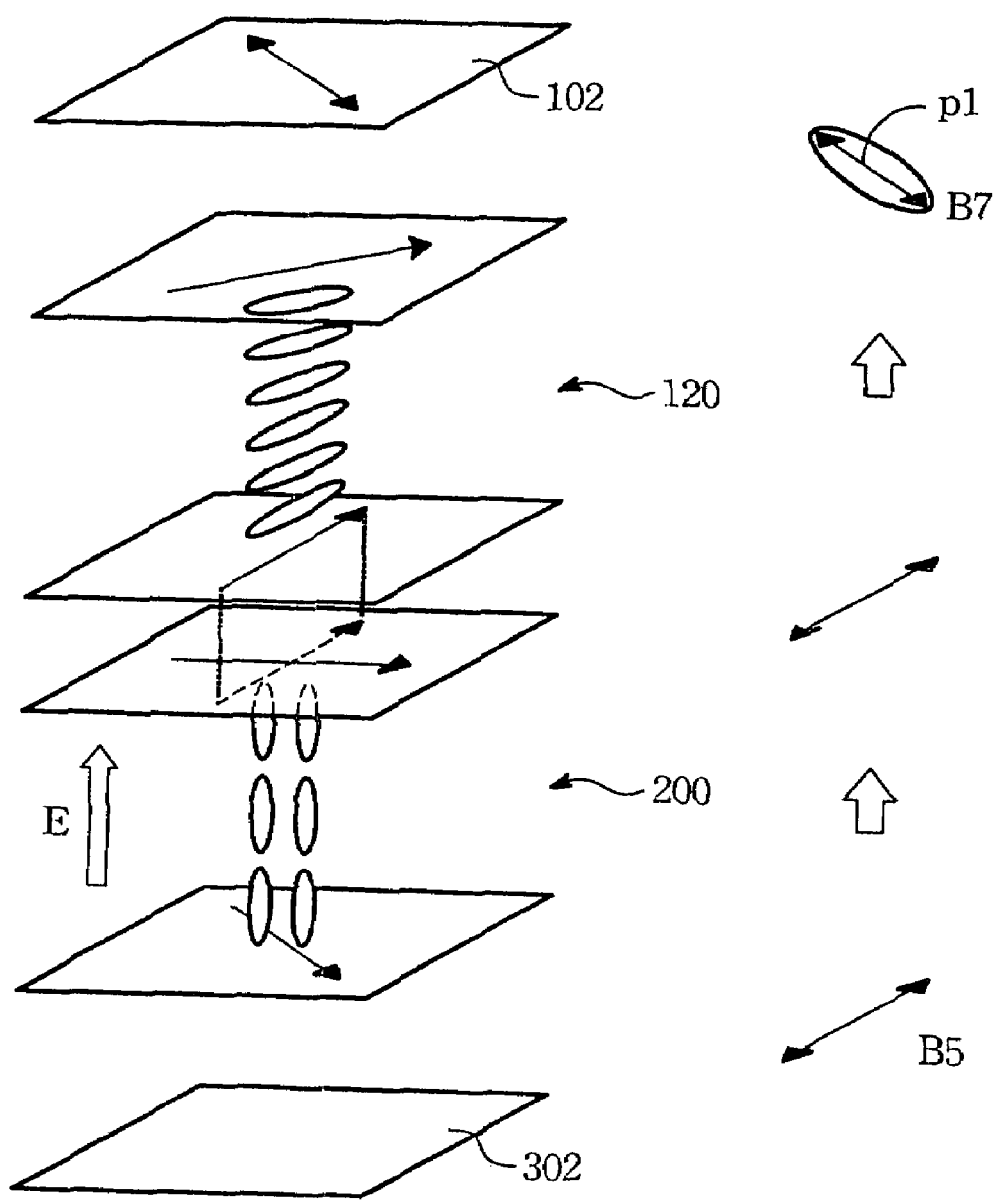
FIG. 5 depicts a schematic view showing an optical modulation result in a transmission region of a transflective-type LCD in accordance with the present invention, with an operation voltage applied therein.

As shown in FIG. 5, in the transmission region T, the backlight passes through the second polarizer 302 to form a linear polarized light B5. Afterward, the linear polarized light B5 can then pass through the liquid crystal layer 200 and the liquid crystal film 120. Since the liquid crystal layer 200 driven by the operation voltage shows no retardation, the linear polarized light B5 is only affected by the liquid crystal film 120. By adjusting the thickness and the spiral angle of the liquid crystal film 120, it is able to transform the linear polarized light B5 into another polarized light B7, which has a main polarizing direction p1 identical to the direction of the transmission axis of the first polarizer 102. In this application, most the illumination of the polarized light B7 can penetrate the first polarizer 102.

Figure 6:
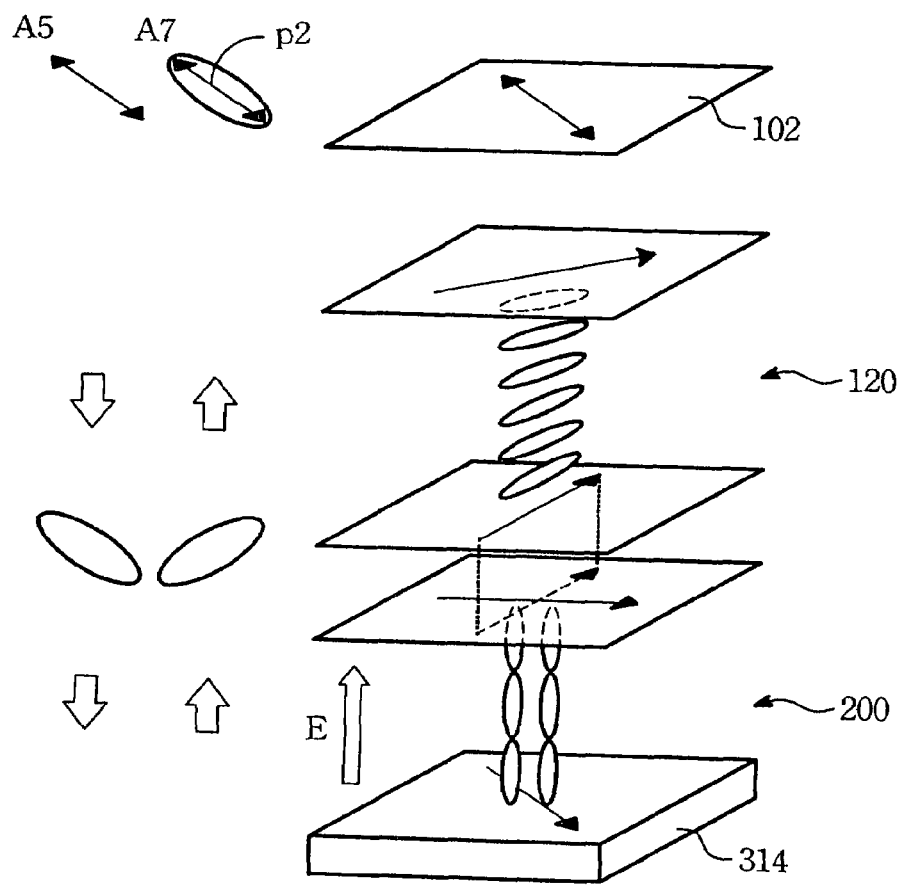
FIG. 6 depicts a schematic view showing an optical modulation result in a reflective region of a transflective-type LCD in accordance with the present invention, with an operation voltage applied therein.

As shown in FIG. 6, in the reflective region R, the ambient light passes through the first polarizer 102 to form another linear polarized light A5. Afterward, the linear polarized light A5 can pass through the liquid crystal film 120 and the liquid crystal layer 200 to reach the reflector 314, and then reflected back into the liquid crystal layer 200 and the liquid crystal film 120 again to reach the first polarizer 102. It is obviously that the linear polarized light A5 undergoes different retardation with respect to the linear polarized light B5 for passing through the liquid crystal Film 120 twice. By adjusting the thickness and the spiral angle of the liquid crystal film 120, the linear polarized light A5 can be successfully transformed into another polarized light A7 who has a main polarizing direction p2 identical to the direction of the transmission axis of the first polarizer 102. In this application, most the illumination of the polarized light A7 can penetrate the first polarizer 102.

In the pixel device of FIG. 2, the thickness of the liquid crystal layer 200 in the transmission region T equals the sum of the liquid crystal layer 200 in the reflective region R and the reflector 314. Therefore, portion of the liquid crystal layer 200 in the transmission region T and that in the reflective region R show different retardation. It is obviously that by adjusting the parameters such as the thickness of the reflector 314, the pre-tilt angle, and the spiral angle of the liquid crystal layer 200 and the liquid crystal film 120, the optical modulation structure composed of the liquid crystal layer 200 and the liquid crystal film 120 can have no retardation effect in the transmission region T but has a quarter-wave retardation in the reflective region R when no operation voltage is applied.

It should be noted that the above description is only directed to the concept of the present invention, but may not lead to an optimal product due to the complication of liquid crystal characters. Therefore, as a preferred embodiment, the retardation difference between the liquid crystal film 120 and the liquid crystal layer 200 in the transmission region T is set as less than 30 nm, the twist angle difference between the liquid crystal film 120 and the liquid crystal layer 200 is set as less than 10 degrees, and the directions of relative liquid crystal molecules in the liquid crystal film 120 and the liquid crystal layer 200 are set to make an angle of 80 to 100 degrees.

By contrast to the prior art, the transflective-type LCD in accordance with the present invention has the advantages of:

1. The liquid crystal film 120 in the present invention is used to replace the quarter-wave plates 106, 306 and the half-wave plates 104, 304, so as to increase the yield but reduce the fabrication cost.

2. The assembling process regarding the quarter-wave plates 106, 306 and half-wave plates 104, 304 is removed in the present invention, so that the product yield can be increased to a substantial extent.

3. It is clear that fewer optical films are used in the transflective-type LCD in accordance with the present invention, so that the absorbed optical energy can be reduced and the operating efficiency can be raised.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. A pixel device of a transflective-type liquid crystal panel comprising:
    an upper panel;
    a lower panel assembled beneath said upper panel and further having an upper surface divided into a reflective region and a transmission region;
    a liquid crystal layer interposed between said upper panel and said lower panel; and
    a liquid crystal film, which is set with an opposing spiral direction with respect to that of said liquid crystal layer, formed on said liquid crystal layer to compensate retardation of said liquid crystal layer,
    wherein a stacked structure comprises said liquid crystal layer in the reflective region and said liquid crystal film, the stacked structure acts as an optical modulation structure adapted to as a quarter-wave plate when no operation voltage being applied.

2. The pixel device of claim 1, wherein a retardation difference between said liquid crystal film and said liquid crystal layer in said transmission region is less than 30 nm.

3. The pixel device of claim 1, wherein respective liquid crystal molecules in said liquid crystal film and said liquid crystal layer are perpendicular to each other.

4. The pixel device of claim 1, wherein respective liquid crystal molecules in said liquid crystal film and said liquid crystal layer make an angle of 80 to 100 degrees.

5. The pixel device of claim 1, wherein a twist angle difference between said liquid crystal film and said liquid crystal layer is less than 10 degrees.

6. The pixel device of claim 1, further comprising a first polarizer on an upper surface of said upper panel and a second polarizer on a lower surface of said lower panel, and respective transmission axes of the first polarizer and the second polarizer are perpendicular to each other.

7. The pixel device of claim 1, wherein said liquid crystal film is a polymer film.

8. The pixel device of claim 1, wherein said liquid crystal layer is one of a twisted nematic type, a super twisted nematic type, and an hybrid nematic type, and said liquid crystal layer and said liquid crystal film belong to the same type.

9. The pixel device of claim 1, wherein the pixel device is applied in a normal-black transflective-type liquid crystal display.

10. A pixel device of a transflective-type liquid crystal panel comprises:
    an upper panel having a first polarizer formed on an upper surface thereof;
    a lower panel, which has a second polarizer formed on a lower surface thereof, assembled beneath said upper panel and having an upper surface thereof divided into a reflective region and a transmission region, wherein respective transmission axes of the first polarizer and the second polarizer are perpendicular to each other;
    a liquid crystal layer interposed between said upper panel and said lower panel; and
    a liquid crystal film, which is set with an opposing spiral direction with respect to said liquid crystal layer, formed on said liquid crystal layer, wherein respective liquid crystal molecules in said liquid crystal film and said liquid crystal layer are perpendicular to each other to compensate retardation of said liquid crystal layer so as to have a backlight shielded by said first polarizer;

wherein a thickness of said liquid crystal layer in the reflective region is smaller than that in the transmission region, and a stacked structure composed of said liquid crystal layer in the reflective region and said liquid crystal film performs as an optical modulation structure like a quarter-wave plate when no operation voltage being applied.

11. The pixel device of claim 10, wherein said liquid crystal film is set with another retardation the same as said liquid crystal layer in amount but opposite in direction.

12. The pixel device of claim 10, wherein a retardation difference between said liquid crystal film and said liquid crystal layer in said transmission region is less than 30 nm.

13. The pixel device of claim 10, wherein a twist angle difference between said liquid crystal film and said liquid crystal layer is less than 10 degrees.

14. The pixel device of claim 10, wherein said liquid crystal film is a polymer film.

15. The pixel device of claim 10, wherein said liquid crystal layer is one of a twisted nematic type, a super twisted nematic type, and a hybrid nematic type, and said liquid crystal layer and said liquid crystal film are of the same type.

16. The pixel device of claim 10, wherein the pixel device is applied in a normal-black transflective-type liquid crystal display.

\* \* \* \* \*